(12) United States Patent
Kubinski

(10) Patent No.: US 6,533,891 B1
(45) Date of Patent: Mar. 18, 2003

(54) BUTT SPLICING OF ELASTOMERIC SHEETS

(75) Inventor: Donald Chester Kubinski, Medina, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/869,541

(22) PCT Filed: Feb. 3, 1999

(86) PCT No.: PCT/US99/02274
§ 371 (c)(1),
(2), (4) Date: Jun. 27, 2001

(87) PCT Pub. No.: WO00/46013
PCT Pub. Date: Aug. 10, 2000

(51) Int. Cl.$^7$ ............................................... B65H 21/00
(52) U.S. Cl. .............................. 156/304.3; 156/304.1; 156/505; 156/507
(58) Field of Search ........................ 156/304.1, 304.3, 156/502, 505, 507

(56) References Cited

U.S. PATENT DOCUMENTS

| | | | |
|---|---|---|---|
| 3,939,031 A | * | 2/1976 | Takimoto ................. 156/304.3 |
| 4,026,753 A | * | 5/1977 | Printz et al. ................. 156/502 |
| 4,042,440 A | * | 8/1977 | Hasegawa et al. ....... 156/304.1 |
| 4,328,066 A | | 5/1982 | Kiuchi et al. |
| 4,401,504 A | | 8/1983 | Kobayashi |
| 4,566,922 A | * | 1/1986 | Martinez .................... 156/159 |
| 4,744,845 A | * | 5/1988 | Posey ......................... 156/159 |
| 4,867,823 A | | 9/1989 | Pizzorno |
| 4,874,443 A | | 10/1989 | Kipling |
| 4,904,319 A | | 2/1990 | Divincenzo et al. |
| 4,946,525 A | | 8/1990 | Aupic et al. |
| 4,954,205 A | | 9/1990 | Agawa |
| 5,021,115 A | | 6/1991 | Tokita |
| 5,062,462 A | | 11/1991 | Rye et al. |
| 5,102,490 A | | 4/1992 | Becker et al. |
| 5,294,274 A | | 3/1994 | Toya |
| 5,329,094 A | * | 7/1994 | Murphy et al. .......... 156/304.6 |
| 5,348,600 A | | 9/1994 | Ishii |
| 5,582,664 A | | 12/1996 | Sergel et al. |
| 6,161,367 A | * | 12/2000 | Walter ........................ 53/133.3 |
| 6,280,556 B1 | * | 8/2001 | Okada et al. ................ 156/264 |

FOREIGN PATENT DOCUMENTS

| | | |
|---|---|---|
| DE | 25 04 181 | 8/1976 |
| DE | 37 15920 | 11/1988 |
| JP | 58076246 | 5/1983 |

* cited by examiner

Primary Examiner—Mark A. Osele
(74) Attorney, Agent, or Firm—Howard M. Cohn

(57) ABSTRACT

An apparatus and method are described for forming and reinforcing a butt splice (21) along the abutting edges (18, 20) of two elastomeric sheets (12, 14) which typically contain a plurality of reinforcing cords (16) extending parallel to one another and to the abutting edges (18, 20) of the sheets. Each butt splice (21) is reinforced with a splice strip (22, 24) which bridges the butt splice. The splice strip (22, 24) is applied to the butt splice (21) using a splice applicating device (60) containing at least one and preferably two applicator heads (66, 68) which move from a splice strip load position $P_1$ to a third position $P_3$ where an applicator head can press the splice strip (22, 24) into contact with the butt splice (21). First, the applicator heads (66, 68) rotate about an axis between the load position $P_1$ and a second position $P_2$ spaced from the butt splice (21). Then, one of the heads (66, 68) reciprocates toward and away from the splice strip application position $P_3$. The splice strip (22, 24) is held on the applicator head (66, 68) by vacuum until the splice strip is pressed against and adhered to the butt splice (21) at which time the vacuum is released and the applicator head (66, 68) is withdrawn.

13 Claims, 4 Drawing Sheets

BUTT SPLICING OF ELASTOMERIC SHEETS

FIELD OF THE INVENTION

The present invention relates to the building of a pneumatic tire, and concerns a method and apparatus for reinforcing a butt splice along the edges of two reinforced elastomeric sheets to form an elastomeric member such as that used in the tire industry for the manufacture of a tire carcass.

BACKGROUND OF THE INVENTION

As conventionally known in the tire manufacturing art, it is a common practice to join or splice the edges of two reinforced elastomeric sheets to form an elastomeric member used for the manufacture of a tire carcass.

Each of the reinforced elastomeric sheets contains a plurality of parallel reinforcing cords encapsulated within an unvulcanized synthetic or natural rubber. The reinforcing cords are substantially equal in diameter and evenly spaced between one another within the sheet. For the manufacture of a tire carcass, particularly when producing radial ply tires, the elastomeric sheets are typically cut into rectangles, which are then assembled to each other by means of a splice along adjoining edges of two adjacent sheets, the splice being parallel to the reinforcing cords.

Two commonly used splices join the edges of adjacent sheets are the butt splice and the overlap splice. The butt splice is formed by pressing one edge of one sheet against an adjacent edge of a second sheet and securing them together by mechanical or physical means, i.e. pressing them together to ensure that they are securely bonded. The overlap splice is made by covering an edge of one sheet by an adjacent edge of a second sheet, and applying pressure to the splice area which includes the overlapped region to ensure a secure bond. The double thickness of the overlap splice in the splice area has several drawbacks. These include the uneven elongation of the elastomeric member due to the difference in elongation of the narrow region of double thickness as compared with the elongation of the elastomeric member in the region of single thickness. This difference in elongation can lead to the creation of a non-uniformity in the resultant tire.

The butt splice overcomes the drawbacks of the overlap splice, i.e. has a single thickness. However, the smaller contact surface between the adjacent edges of the two sheets being assembled together inherently creates a weaker bond between the two sheets than the bond formed with the overlap splice. Also, a successful butt splice is more difficult to consistently achieve in a manufacturing environment as it depends on the proper preparation of the edges of the elastomeric sheet to ensure that the spacing between the cords at the two adjoined edges of the butt splice is no greater and no less than the spacing between the remaining cords in the sheets. Either condition, i.e. the spacing between cords along the edges of the two sheets being assembled being either greater or less than the spacing of the other cords in the two sheets, can result in non-uniform strength across the resulting elastomeric member, uneven stretching of the elastomeric member during its expansion while forming the tire carcass, and a greater likelihood of splice failure in the resultant tire.

Another approach toward reducing or eliminating the problems associated with effectively splicing together two reinforced elastomeric sheets is to bridge the butt splice with a reinforcing strip extending the length of the splice. This approach provides a partial solution to the problem because it was always accomplished by manually applying the reinforcing strip. Until now, no one has been able to effectively apply the reinforcing strip in a manufacturing environment. Moreover, the manual application of the reinforcing strip was not a completely satisfactory solution because of the inherent variations in the thickness and length of the reinforcing strip and the added manufacturing time and costs associated with the manual application of the reinforcing strip.

A further attempt to reduce the adverse effects of using a reinforcing strip to bridge the butt splice of reinforced elastomeric articles is described in U.S. Pat. No. 5,062,462 ('462), issued Nov. 5, 1991 and having a common assignee with the present invention. This '462 patent describes the use of a thin splicing strip made from a spun bonded material having stress/ strain/ expansion characteristics closely resembling those of the elastomer in the article. The splicing strip is manually applied across the area being spliced, contributing to increasing the labor costs associated with construction of a tire using a butt splice.

U.S. Pat. No. 4,328,066 ('066), issued May 4, 1982, describes a tape splicing apparatus in which two tapes are joined by splicing tape. The apparatus addresses a problem of entrapping air bubbles under the splicing tape. A drum body (59) holds a splicing tape segment ($T_3$) by suction pressure applied through holes in the peripheral surface of the drum. The drum is lowered into a splicing position to press the sticky side of the tape segment against the abutting tape joint, and the tape segment is initially attached along only a single line. It is frequently observed that only the portion of the splicing tape segment which corresponds to the butt joint is stuck to the abutted tapes, with the remaining portion(s) left curled upwardly (see column 10, lines 29–34). A separate mechanism, in the form of a movable depressing roller (94), then presses the splicing tape segment, which was initially attached along only the single line, in forward then rearward directions from the center of the joint so that no air can be entrapped under the splicing tape. (see Abstract)

OBJECTS AND SUMMARY OF THE INVENTION

It is an object of the present invention to provide a method and apparatus for applying a splice strip along a butt splice of two elastomeric sheets as defined in one or more of the appended claims and, as such, having the capability of accomplishing one or more of the following subsidiary objects.

Another object of the present invention is to provide a method and apparatus for improving the repeatability and reliability of the butt splice of reinforced elastomeric sheets.

Yet another object of the present invention is to provide a method and apparatus for increasing the rate for butt splicing reinforced elastomeric sheets while concomitantly reducing the labor costs and the overall expense of effectively splicing the two sheets together.

The present invention relates to a method of butt splicing the edges of two elastomeric sheets. The elastomeric sheet can be, if desired, reinforced with parallel cords of a non-metallic material such as polyester, cotton, rayon, nylon or aramid or of a metallic material such as for example filaments of steel which have been plated with brass. In the reinforced elastomeric sheets, the cords run parallel to one another and to the edges of the sheets being assembled together, and are evenly spaced from one to another in the sheets. The method includes the steps of securing adjacent edges of two elastomeric sheets together with the butt splicing technique. Then a thin splice strip of an uncured elastomer such as gum rubber, preferably reinforced with cords or a non-woven fabric, is applied across the butt splice securing the elastomeric sheets together. This is accomplished by first locating the splice strip onto an applicator head and holding it in place by a vacuum. The applicator head is then moved to press the splice strip against the butt splice. After the splice strip is securely in place, the vacuum is removed to release the splice strip from the applicator head and the applicator head returns to pick up another splice strip.

The applicator head is preferably rotated from a first load position where the splice strip is loaded on the head to a second position in close proximity to the butt splice. From there, the applicator head is moved to a third position where the splice strip can be pressed into contact with the butt splice. The splice strip is preferably the same length as the butt splice.

A second splice strip is loaded onto a second applicator head in the load position while the first applicator head is in the second position either before or after applying the splice strip onto the butt splice with the first applicator head. The second splice strip is held to the second head by vacuum in the same manner as the first splice strip is to the first head. The second applicator head is rotated into the second position as the first applicator head is rotated away from the second position in proximity to the butt splice and back to the load position. The second splice strip is then pressed into contact with a second butt splice and the vacuum is released to free the second splice strip from the second applicator head. The first and second applicator heads can be moved between the first load position and the second position by oscillating back and forth through an arc of 180° or by rotating in the same direction, and stopping each 180° to load one splice strip onto one applicator head while the other applicator head is at the second position above the third location while the other splice strip is applied onto the second butt splice.

The invention further includes a method of reinforcing a butt splice along the edges of two adjacently disposed elastomeric sheets, comprising the following steps. A splice strip is loaded on an applicator head at a first load position. The applicator head is moved to press the splice strip into contact with the butt splice. The applicator head is moved from the first load position to a second position in proximity to the butt splice. Then the applicator head is moved to a third position where the splice strip is first pressed into contact with the butt splice and subsequently the vacuum is released. Next, the splice strip is released from the applicator head by releasing the vacuum pressure used to hold the splice strip on the applicator head. The method can further include the additional steps of placing a second splice strip on a second applicator head in the load position; moving the first applicator head away from the butt splice after releasing the first splice strip; moving the second applicator head to the second position and then to the third position to press the second splice strip into contact with a second butt splice; and releasing the second splice strip from the second applicator head. The first applicator head and the second applicator head are oscillated or rotated through an arc of 180° between the first load position and the second position.

The invention also includes a splice strip applicating device for applying a splice strip over a butt splice. The device comprises a first applicator head, structure for applying and temporarily holding a splice strip in a first load position on the first applicator head, structure for moving the first applicator head to a second position into pressure contact with the butt splice, and structure for releasing the splice strip from the first applicator head. The device preferably includes a second applicator head disposed so that the first and second applicator heads are mounted in diametrically opposed relationship to one another with respect to the axis a shaft adapted for rotating or oscillating movement about the axis of the shaft. This arrangement of the splice strip applicating device permits the first applicator head to be in the splice strip load position while the second applicator head is in the second position 180° around the axis and in close proximity to the butt splice. The device includes a dispenser for feeding a length of the splice strip onto either of the applicator heads in the load position. It also includes a gripper to clamp on to a length of splice strip and to load the splice strip on one applicator head, and a cutter to cut the splice strip to a predetermined length while being held on an applicator head.

BRIEF DESCRIPTION OF THE DRAWINGS

The structure, operation, and advantages of the invention will become further apparent upon consideration of the following description taken in conjunction with the accompanying drawings, wherein.

DEFINITIONS

As used herein, the following terms have the following meanings: "Reinforced elastomeric sheet" means a sheet of natural or synthetic rubber containing a plurality of reinforcing cords encapsulated in the rubber, extending in a longitudinal direction, the cords being equally spaced from one another across the width of the sheet, parallel to one another and to the edges of the sheet; "Elastomeric member" means a composite of two or more reinforced elastomeric sheets which are spliced along their adjoining edges; and "Reinforcing cords" are cords made from natural or synthetic fibers such as cotton, rayon, polyester, nylon or aramid, or from steel or other metal wires or filaments which are braided, twisted or woven together.

DETAILED DESCRIPTION OF THE INVENTION

This invention relates to joining the edges of two elastomeric sheets of the type used in a construction of a pneumatic tire. More particularly, the present invention relates to splicing together adjacent reinforced elastomeric sheets, each containing a plurality of parallel extending, reinforcing cords encapsulated in an elastomeric material such as a natural or synthetic rubber compound. All of the reinforcing cords are substantially equal in diameter and equally spaced from each other. The density of reinforcing members is stated in terms of ends per centimeter (epc) or ends per inch (epi) and is defined as the number of reinforcing members per unit length, as counted in a direction perpendicular to the longitudinal direction of the reinforcing members. A cord density between about 3.2 epc (8 epi) and about 12.8 epc (32 epi) is conventionally used for reinforcing elastomeric members used to make tire carcass plies. Typically, the reinforcing cords are made from suitable materials such as cotton, polyester, nylon, rayon, aramid, fiberglass or metal. A suitable metal comprises filaments of steel which have been plated with brass to provide better adhesion to rubber. The cords are encapsulated in a natural or a synthetic rubber compound.

Figure 1:
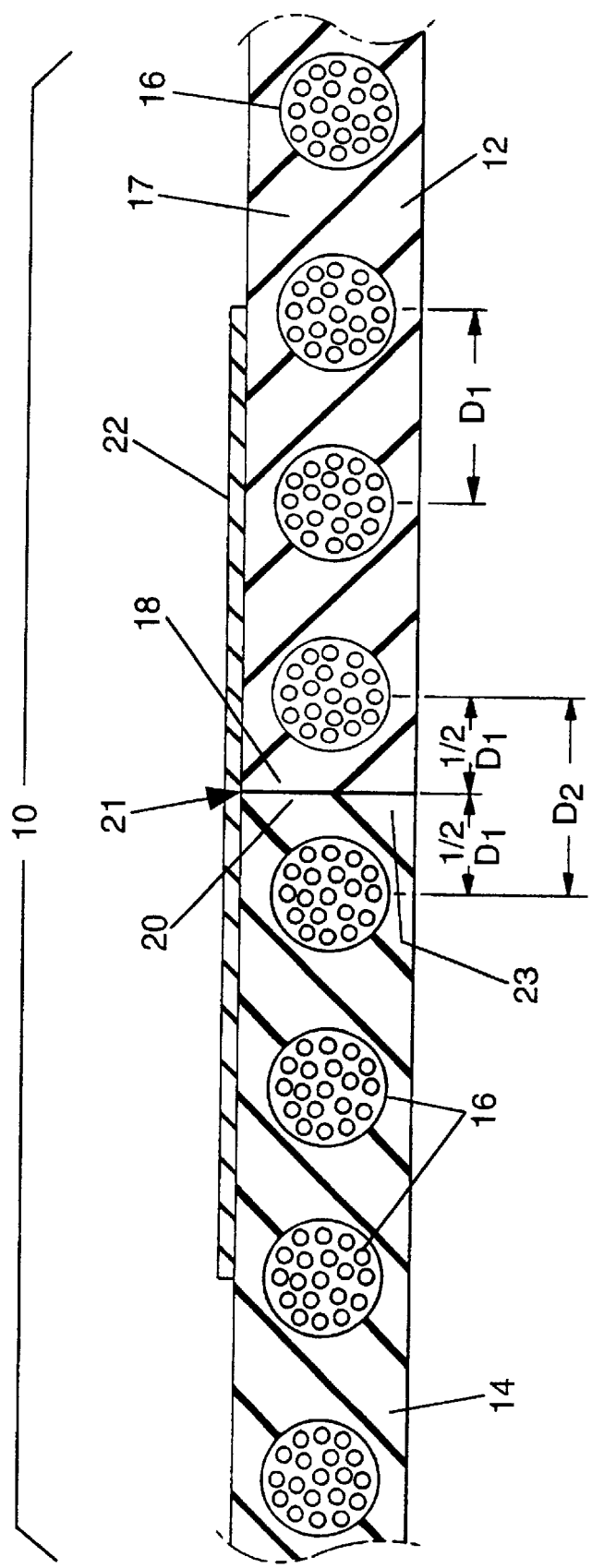
FIG. 1 is a cross-sectional end view of a butt splice between two elastomeric sheets reinforced with a splice strip in accordance with the present invention.

Referring in greater detail to the drawings, FIG. 1 is a cross-sectional view of a portion of an elastomeric member 10 produced by splicing two reinforced elastomeric sheets 12, 14 with a butt splice 21. The butt splice 21 is formed along the adjacent edges of the ends 18, 20 of the two reinforced elastomeric sheets 12, 14, respectively. Each elastomeric sheet 12,14 contains reinforcing cords 16. The cords 16 are embedded in a suitable elastomeric material 17 such as natural rubber, Neoprene or butadiene compounded with additives such as antioxidants, extenders, carbon black, fillers, and curing agents. The cords 16 in each sheet 12, 14 are parallel to one another and are evenly spaced by a distance $D_1$. The cords 16 are also parallel to the edges 18,20 of the sheets 12,14 respectively, and preferably separated therefrom by a thickness of elastomer equal to ½ $D_1$ as shown in FIG. 1.

The two reinforced sheets 12, 14 are bonded together by a butt splice 21 to form the elastomeric member 10. Conventional wisdom dictates that the spacing $D_2$ between the cords 16 on either side of the splice 21 be equal to the interval spacing $D_1$ between the cords within each sheet 12,14. In this manner, the uniformity of the reinforced elastomeric member 10 across its width is preserved. If the spacing $D_2$ is less or more than $D_1$, the properties of the elastomeric member 10 in the splice area 23 are different than elsewhere throughout the elastomeric member, as discussed herein before.

Figure 2:
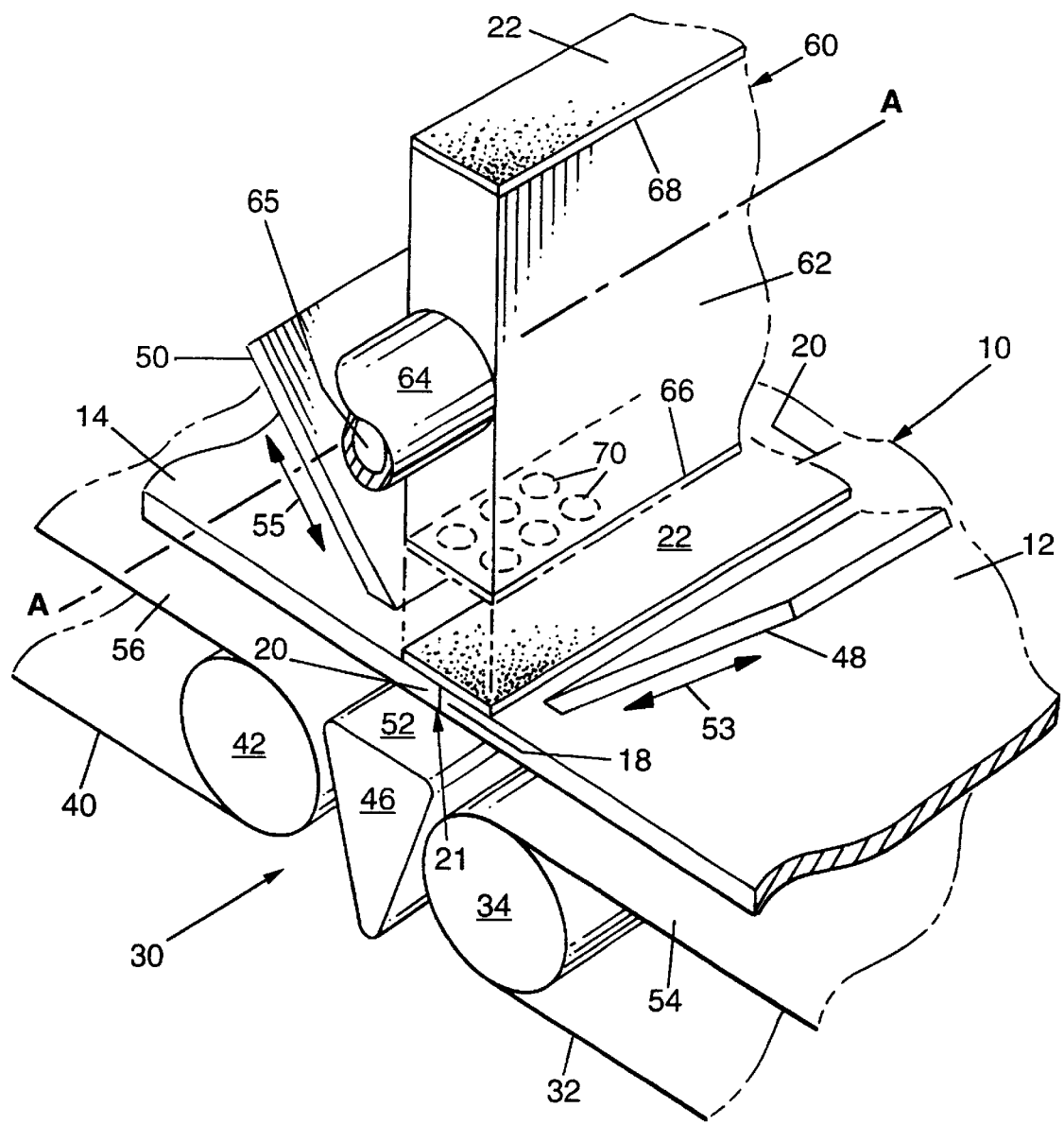
FIG. 2 is a perspective view of a butt splice applicating device applying a splice strip to a butt splice region of two elastomeric sheets in accordance with the present invention.

Referring to FIG. 2, the splicing machine or equipment 30 used for butt splicing two reinforced sheets 12,14 together is shown in perspective. The splicing equipment 30 includes a first conveyor belt 32 moving around two or more rollers 34, and a second conveyor belt 40 moving around two or more rollers 42. An anvil 46 is positioned between the conveyor belts 32, 40 with the top surface 52 of the anvil coplanar with both the top surface 54 of the first conveyer belt 32 and the top surface 56 of the second conveyer belt 40. A pair of diagonally movable splicing bars 48, 50 are spaced above the conveyor belts 32, 40 and the anvil 46. The splicing bars 48, 50 are adapted to reciprocate in a direction back and forth with respect to the anvil surface 52 as shown by the arrows 53,55. The bars 48,50 push against the two sheets 12, 14, respectively, near their edges 18,20 and cause the sheets to slide over the surface 52 of anvil 46 so that the edges 18,20 are forced into one another to form the butt splice 21.

Figure 3:
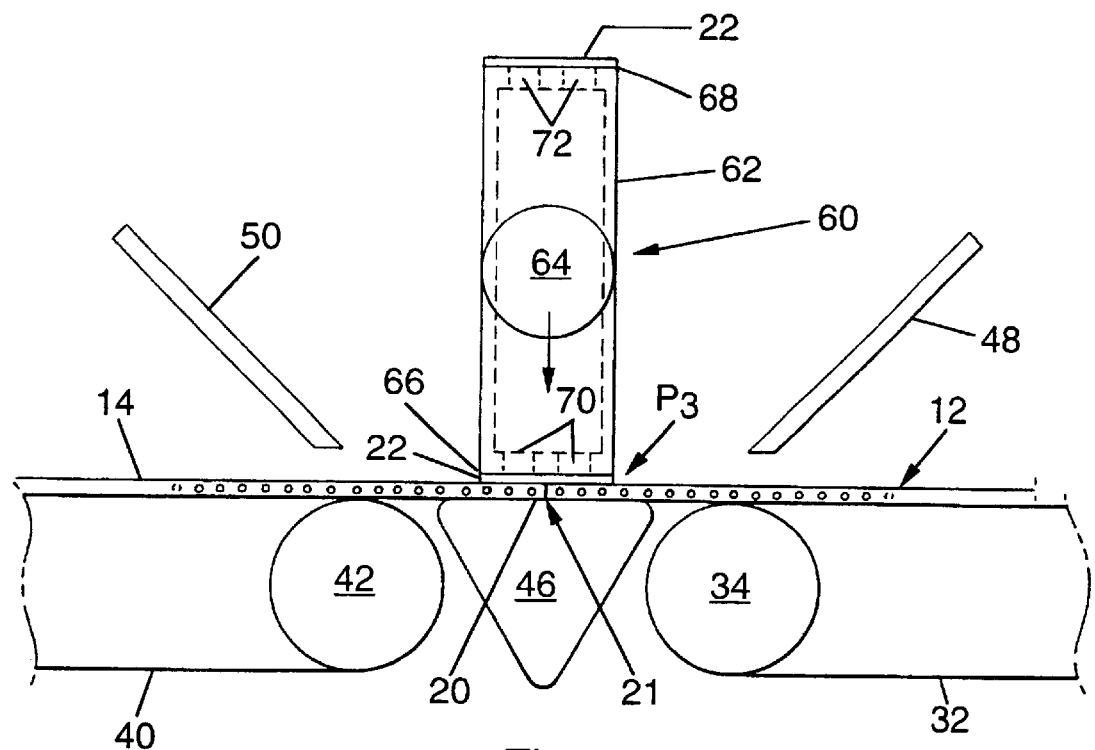
FIGS. 3 and 4 are elevational views showing the sequential steps in forming and reinforcing butt splices.
Figure 4:
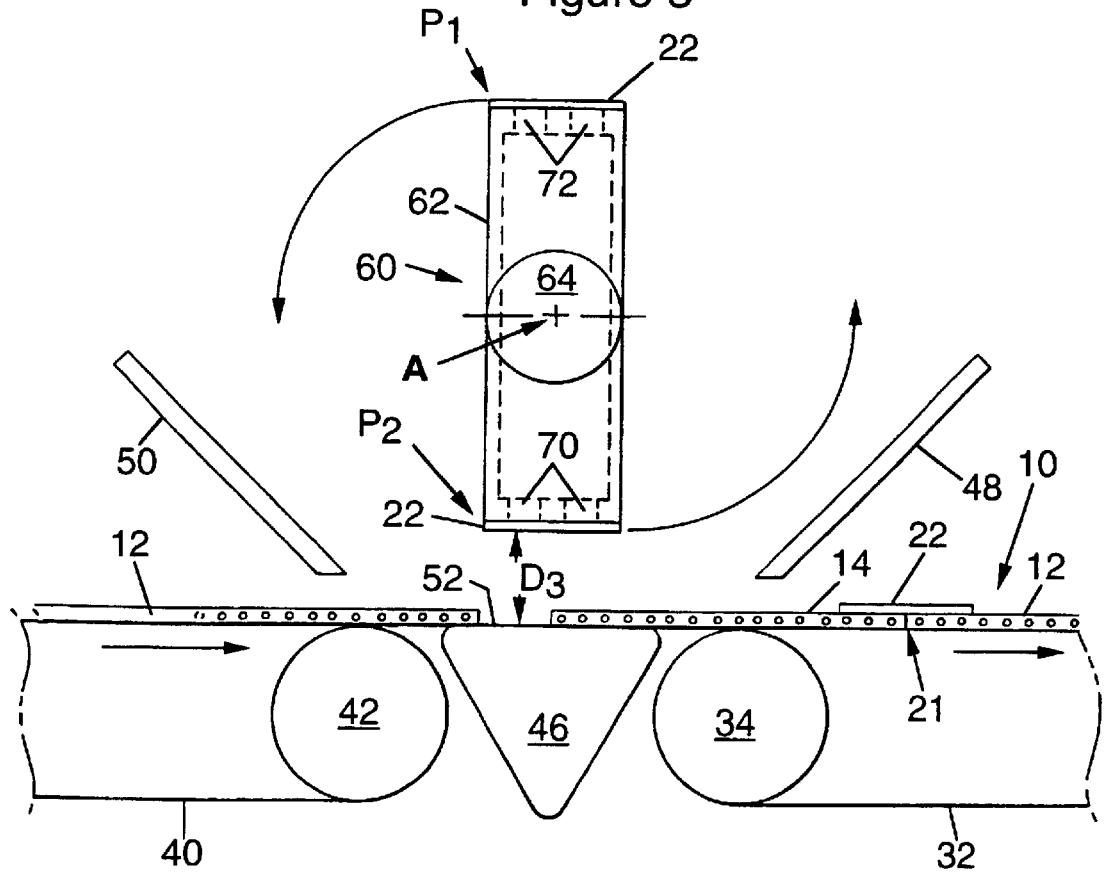

The splicing equipment 30 of the present invention includes a splice strip applicating device 60 that is preferably positioned immediately above the anvil 46. The splice strip applicating device 60 has an enclosed rectangularly shaped vacuum container 62 fixedly mounted on a shaft 64 that rotates vacuum container 62 about an axis A—A. Strip applicating device 60 includes two rectangularly shaped applicator heads 66, 68 which are located on opposite ends of vacuum container 62. Each head 66, 68 as seen in FIGS. 3 and 4, preferably contains a plurality of ports 70, 72 connected to a vacuum pressure source (not shown) which can be drawn from the vacuum container 62 through, for example an open passage 65 through shaft 64. The vacuum pressure source is capable of drawing a vacuum of about one atmosphere. The amount of vacuum pressure is adjusted to hold a splice strip 22 on each of the applicator heads 66, 68. The vacuum container 62 is reciprocally movable within a support structure (not shown) that includes a controller (not shown) that can be programmed to rotate one applicator head 66 through an arc of 180° from a splice strip load first position $P_1$ to a second position $P_2$ spaced above surface 52 of anvil 46, as shown in FIG. 4. The splice strip applicating device 60 is also programmed to move the applicator head then disposed at second position $P_2$ (see FIG. 4) in a linear direction for a distance $D_3$ from the second position $P_2$ to a third position $P_3$. The applicating device 60 at position $P_3$, then presses a splice strip 22, as shown in FIG. 3, against the butt splice 21 until the splice strip 22 is pressed into contact with the butt splice 21 previously formed on the anvil 46 with splicing bars 48,50 as described above. Device 60 is further programmed to withdraw the applicator head from the splice 21 after the vacuum is turned off and the splice strip is released from the applicator head. Any suitable mechanical, pneumatic, hydraulic or servo-electric control, all of which are well known in the art, can be used for moving the vacuum container 62 through the sequence of operations. It should be understood that each of the applicator heads 66,68 preferably reciprocate together as a single unit toward and away from the third position $P_3$ to apply the reinforcing strip 22 to the butt splice 21. Alternatively, the heads 66,68 can be made independently movable with respect to the remainder of the vacuum container 62 toward and away from the position $P_3$ and butt splice 21.

The vacuum ports 70 on first applicator head 66 are preferably connected through a manifold (not shown), possibly extending through bore 65 extending though shaft 64, to a vacuum pressure source. The vacuum ports 72 on second applicator head 68 are preferably connected through a separate manifold to the same or a separate vacuum source. Through suitable valving and controls, a vacuum pressure can be selectively drawn on one applicator head at a time. The vacuum container 62 can be mounted for rotational and reciprocating movements and a separate vacuum hose can be coupled to each of the manifolds to selectively supply vacuum through the ports 70, 72 of applicator heads 66,68, respectively. That is, the vacuum container 62 can rotate from position $P_1$ clockwise 180° about axis A—A to position $P_2$. Then the head goes through a reciprocating movement to a position $P_3$ to apply the splice strip and then back to position $P_2$ from which the applicator head then rotates back in the counter-clockwise direction to position $P_1$ to begin the cycle again.

Alternatively, the two applicator heads 66, 68 can be rotated about axis A—A 180° in the same direction between the splice strip load position $P_1$ and the second position $P_2$. The applicator heads 66, 68 in this alternative embodiment still have a reciprocating movement from position $P_2$ to splice strip application location $P_3$. The latter embodiment will require journalling of the vacuum hoses to the vacuum source to permit the continual rotation of a vacuum container 62 in the same direction.

FIG. 3 shows a pair of elastomeric sheets 12, 14 joined together to form a butt splice 21 by the movement of splicing bars 48,50 pressing the ends of sheets 12,14 against each other. The two diagonal splicing bars 48, 50 are shown withdrawn from the splice 21 and the strip applicating device 60 is shown being moved down into position $P_3$ to press the splice strip 22 against the butt spice 21 which in turn is being supported upon the surface 52 of anvil 46. As the splice strip 22 moves into contact with the butt splice 21, the vacuum to the first applicator head 66 is released. The tackiness of the uncured rubber splice strip 22 and the elastomeric sheets 12, 14 ensures that they remain adhered to one another as the strip applicator device 60 is moved away from the butt splice 21 to position $P_2$.

FIG. 4 shows the next step in the sequence with arrows whereby the strip applicator device 60 is rotated 180° to move the second applicator head 68 loaded with a splice strip 22 to the second position $P_2$ above the anvil 46 as the empty applicator head 66 is rotated to the splice strip load position $P_1$ where another splice strip is loaded thereon. Concurrently, the elastomeric member 10 is moved to the right on the conveyor belts 32, 40 until the free end 18 of the elastomeric member 10 is centered on surface 52 of anvil 46. A first elastomeric sheet 12 is then moved toward anvil 46 by conveyor belt 40 until its forward free edge 20 is in abutting relationship with the free edge 18 of the second sheet 14 of member 10. This procedure can be repeated until a reinforced elastomeric member having the desired length is formed.

The conveyor belts 32, 40 are capable of moving in the same direction or in opposite directions depending upon the end use requirements for feeding elastomeric sheets 12,14 to the butt splicer 60 and to shift or transfer the spliced elastomeric members 10 away. For example, if an elastomeric member is constructed of only two sheets, the two sheets may be fed to the splicer on separate conveyor belts from opposite directions where they meet, are butt spliced with the splicer bars, and are reinforced with the splice strip 22 to form the reinforced elastomeric member 10. The member 10 is then transferred on either conveyor belt to the next station. Alternatively, if more than two sheets are to be spliced together, the first two sheets are spliced and are then transferred along one conveyor belt until the exposed or open edge of one of the sheets is positioned over the anvil. Then a third sheet is then moved on the other conveyor to abut the exposed edge and to form the splice as described before.

Figure 5:
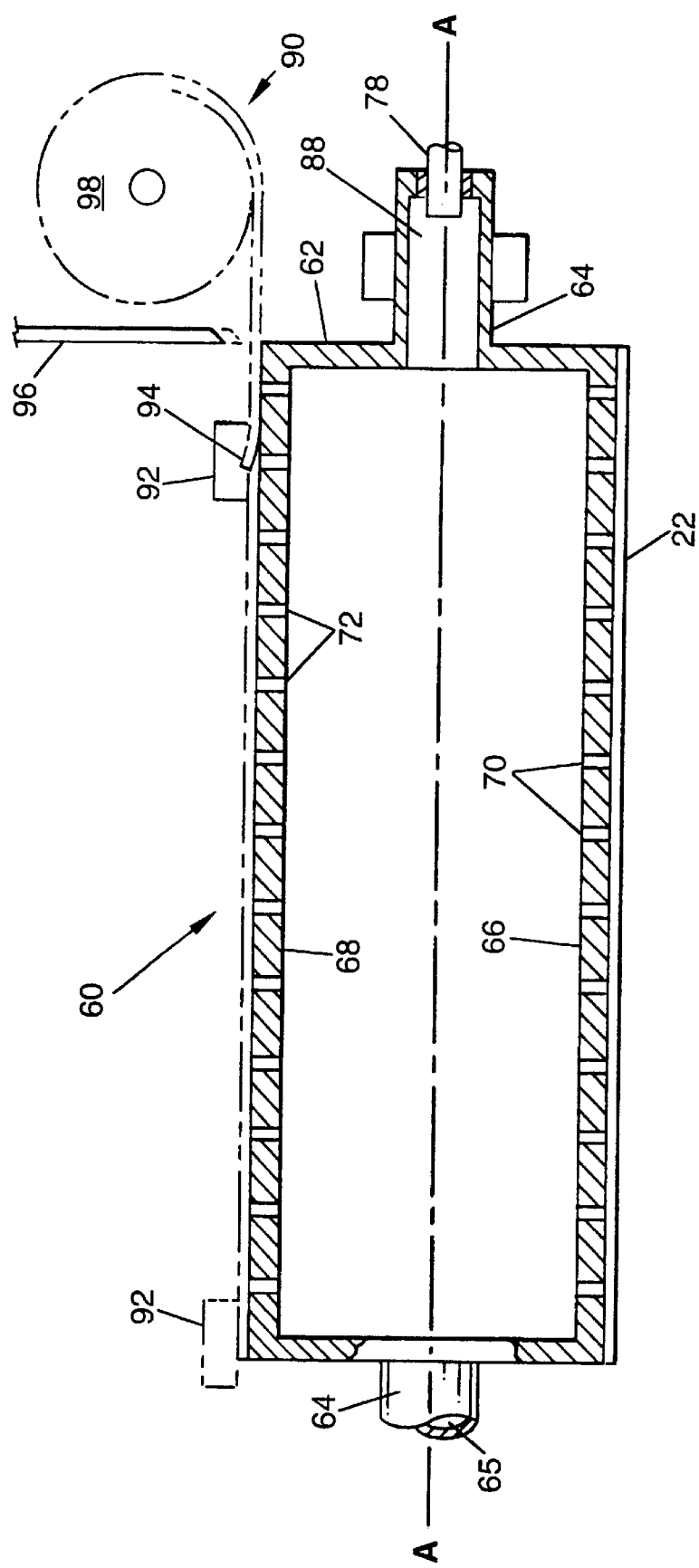
FIG. 5 is an elevational view, partially in cross section, showing details of the applicator heads.

Turning now to FIG. 5, there is shown a cross sectional view of a rectangularly shaped vacuum container 62 the splice strip. The applicating device 60 is mounted to rotate on a shaft 64 about axis A—A. The chamber 62 has a first and second applicator heads 66, 68, respectively. The first applicator head 66 has a plurality of vacuum ports 70. The second applicator head 68 likewise has a plurality of vacuum ports 72. All of the vacuum ports in each head are typically connected through a manifold (not shown) to a vacuum pump of known design and operation, capable of drawing at least about 1 (one) atmosphere (760 mm of Hg). A vacuum hose 78 is shown passing through a hollow end 88 of the shaft 64 into the interior of the vacuum container 62 where the hose may be split into two with each branch connected through suitable valving (not shown) to one set of ports.

The vacuum container 62 can be controlled to rotate 180° on the shaft 64 so as to move the applicator head 66 from the load position $P_1$, as shown in FIG. 4, where it receives a first splice strip 22 to the second position $P_2$ over a butt splice 21 while concurrently, the second applicator head 68 is rotated 180° back from the second position $P_2$ to the load position $P_1$ for reloading with another splice strip 24.

The splice strips 22 can be loaded onto the applicator heads in the following manner. A dispenser 90 holding a roll 98 of splice material is positioned in proximity to the load position $P_1$. A gripper 92 of conventional design grabs the free end 94 of the roll 98 of splice material and pulls it along the length of the applicator head 68 as shown. A vacuum pressure being present at ports 72 releasably holds the strip to the applicator head 68. The cutter knife 96 then cuts the splice material to the predetermined length corresponding to the length of the butt splice 21.

By using the method and a tire building device of the present invention, a tire can be built with improved uniformity and reduced incident of failure due to separations of the butt splices. Furthermore, by using butt splices instead of lap splices in the construction of the tire, there is a substantial reduction in the number of completed tires with visually undesirable sidewall ripples. Finally, the production rate of tires can be substantially increased, such as in the order of 10%.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed is:

1. A device for applying a reinforcing splice strip over a butt splice between two elastomeric sheets characterized by:
   a first applicator head for loading and releasably holding the splice strip in a first load position;
   a second applicator head for loading and releasably holding a second splice strip;
   means for moving the first and second applicator heads from the first load position to a second position spaced from the butt splice;
   means for moving the first and second applicator heads from the second position to a third position;
   means for releasing the splice strip from the first and second applicator heads wherein the first and second applicator heads are fitted to allow depressing the splice strip over the butt splice while at the third position;
   means for selectively applying a vacuum pressure at a plurality of ports at the first and second applicator heads for separately holding the splice strip on the first applicator head and the second splice strip on the second applicator head;
   a vacuum chamber mounted on a shaft that moves through an arc about an axis A—A extending longitudinally through the shaft so that the first applicator head and the second applicator head rotatingly move between the first load position and the second position; wherein the first applicator head and the second applicator head are positioned on diametrically opposite sides of the axis A—A whereby one applicator head is in the first load position while the other applicator head is in the second position, and the first applicator head and the second applicator head move through an arc of 180° about the axis A—A between the first load position and the second position;
   a dispenser for feeding material from a roll of splice material to either the first or the second applicator head; and
   a gripper to clamp on to a free end of a strip forming the roll of splice material, and to load the strip on one of the first and second applicator heads while the one applicator head is in the first load position.

2. The device of claim 1 further characterized by a cutter to cut the splice strip, while held on either the first or the second applicator heads, to a predetermined length corresponding to the length of a splice to be reinforced.

3. A device for applying a reinforcing splice strip over a butt splice between two elastomeric sheets characterized by:

a first applicator head for loading and releasably holding the splice strip in a first load position;

a second applicator head for loading and releasably holding a second splice strip;

means for moving the first and second applicator heads from the first load position to a second position spaced from the butt splice;

means for moving the first and second applicator heads from the second position to a third position;

means for releasing the splice strip from the first and second applicator heads wherein the first and second applicator heads are fitted to allow depressing the splice strip over the butt splice while at the third position;

a dispenser for feeding material from a roll of splice material to either the first or the second applicator head; and a gripper to clamp on to a free end of a strip forming the roll of splice material, and to load the strip on one of the first and second applicator heads while the one applicator head is in the first load position.

4. The device of claim 3 further characterized by a cutter to cut the splice strip, while held on either the first or the second applicator heads, to a predetermined length corresponding to a length of the butt splice to be reinforced.

5. The device of claim 3 further characterized by means for selectively applying a vacuum pressure at a plurality of ports at the first and second applicator heads for separately holding the splice strip on the first applicator head and the second splice strip on the second applicator head.

6. The device of claim 5 further characterized by a vacuum chamber mounted on a shaft that moves through an arc about an axis A—A extending longitudinally through the shaft so that the first applicator head and the second applicator head rotatingly move between the first load position and the second position.

7. The device of claim 6 characterized by the first applicator head and the second applicator head being positioned on diametrically opposite sides of the axis A—A whereby one applicator head is in the first load position while the other applicator head is in the second position.

8. The device of claim 7 further characterized in that the first applicator head and the second applicator head move through an arc of 180° about the axis A—A between the first load position and the second position.

9. A method of reinforcing a butt splice along ends of elastomeric sheets comprising the steps of:

a) loading a splice strip onto an applicator head at a first load position by using a gripper to clamp on to a free end of a roll of splice material, pulling the splice material onto the applicator head, and cutting the splice strip to a predetermined length corresponding to a length of the butt splice to be reinforced;

b) rotating the applicator head to a second position spaced from the butt splice;

c) translationally moving the applicator head to a third position;

d) pressing the splice strip into contact with the butt splice at the third position;

e) releasing the splice strip from the applicator head; and f) moving the applicator head from the third position to the second position.

10. The method of claim 9 including the step of holding the splice strip on the applicator head by vacuum pressure.

11. The method of claim 10 including the steps of:

holding the splice strip to the applicator head as the applicator head is moved from a first load position where the splice strip is loaded on the applicator head to the second position in proximity to the butt splice;

moving the applicator head to the third position where the splice strip is pressed into contact with the butt splice; and releasing the vacuum pressure on the applicator head to release the splice strip from the applicator head after the splice strip is adhered to the butt splice.

12. The method of claim 11 including the additional steps of:

loading a second splice strip onto a second applicator head in the first load position;

moving the second applicator head to the second position spaced from the butt splice;

moving the second applicator head to the third position to press the second splice strip into contact with a second butt splice; and releasing the second splice strip from the second applicator head after the second splice strip is adhered to the second butt splice.

13. The method of claim 12 including the steps of:

positioning the applicator head and the second applicator head on diametrically opposite sides of an axis A—A whereby one applicator head is in the first load position while the other applicator head is in the second position; and rotating the applicator head and the second applicator head about the axis A—A through an arc of 180° between the first load position and the second position.

* * * * *